United States Patent Office 3,417,142
Patented Dec. 17, 1968

3,417,142
MANUFACTURE OF ACETONE-DIPHENYLAMINE CONDENSATION PRODUCT
Morley Morgana, Baton Rouge, La., assignor to Grant Chemical Company, Inc., Baton Rouge, La., a corporation of Louisiana
No Drawing. Filed Mar. 14, 1966, Ser. No. 533,772
3 Claims. (Cl. 260—576)

ABSTRACT OF THE DISCLOSURE

A process for the manufacture of acetone-diphenylamine condensation product adaptable to a continuous operation, which by control of the reaction variables such as temperature, residence time, reactant ratios and catalyst ratios, provides a product suitable as an anti-oxidant, having desirable low viscosity characteristics.

---

This invention relates to an improved process for producing anti-oxidant materials by condensation of acetone and diphenylamine. In particular, it relates to a process which provides such condensation products having high rubber stabilizing properties and those preferred handling characteristics characterized by low volatility and viscosity, said process being particularly adapted to the manufacture of such materials under conditions of high efficiency with respect to heat requirements, equipment throughput, and product quality control.

Of the several ketone and aldehyde condensation products with aryl amines which have been successfully employed in the protection of natural and synthetic rubbers against deterioration by oxygen, one of the most important is the condensation product of acetone and diphenylamine. As the art has progressed, a free-flowing, as opposed to a high viscosity or even solid material, has come to be preferred. A variety of processes and compounding techniques have been developed to provide materials of this nature. While in general satisfactory, the art has not had the benefit of a process which can provide such anti-oxidant materials having a range of desired properties which can be readily controlled by variations in the manufacturing operations. It is understood that the manufacture of such products comprises heating acetone and diphenylamine in an autoclave or other pressure vessel in the presence of appropriate catalysts for extended periods of time to produce material having a narrow range of desirable physical properties. Heretofore, it has not been possible to control such a process to provide anti-oxidants of high stabilizing power but having a wide range of physical properties so as to be tailored to the requirements of the particular manufacturing steps employed in the production of the rubber material in which it is employed.

Previous processes for the manufacture of such materials which have enjoyed success in the art have been directed to the provision of either of two types of material. Thus, in the earlier processes relatively low temperatures and long reaction times have produced material having viscosities in the neighborhood of 300 to 500 poises at 30° C. A more recent product marketed in the viscosity range of 25 to 75 poises at 30° C. has been produced at slightly more elevated temperatures and long reaction time. It has been stated in discussions of these latter processes that such low viscosity material can only be provided under a narrow range of temperatures not exceeding 310° C. and that increasing the temperature under the conditions employed provides material having a viscosity greater than 100 poises at 30° C. Reaction times of the order of 8 to 10 hours at the higher temperatures, and 12 to 24 hours at the lower temperatures have been necessary with apparently no significant change in properties so long as the temperatures disclosed are adhered to.

Contrary to these earlier disclosures, it has now been established that by employing considerably higher temperatures than any disclosed in the prior art, and by careful correlative control of (1) the reaction time, (2) amount of catalyst and (3) feed ratio of reactants, products having extremely high stabilizing ability and a wide range of viscosities can be produced. In general, those catalysts previously employed in the condensation of acetone and diphenylamine can be employed in the present process, but of these, those containing iodine are preferred. Thus, the preferred catalysts employed in this invention are iodine and metallic iodides, in particular, transition metal iodides such as ferrous iodide. Under the high temperature conditions employed in the process of this invention the effect of the quantity of catalysts employed on the viscosity of the product at constant conditions of temperature and time is pronounced. Conversely by employing the temperatures of this process and maintaining the catalyst concentration constant, a product of any desired viscosity can be produced primarily by controlling the time at which the reaction mixture is subjected to reaction temperature and, less critically, to the feed ratio of acetone and diphenylamine.

Therefore, the process of this invention comprises reacting acetone and diphenylamine in a feed weight ratio of between 0.4 and 0.7 part of acetone per part of diphenylamine, in the presence of an iodine-type catalyst in the ratio of 0.3 to 1.5 parts of iodine per one hundred parts of diphenylamine, with a preferred ratio being between 0.4 and 1.2, at a temperature between 315° C. and 350° C. for a period of time of between one hour and eight hours to produce a diphenylamine-acetone condensation product having a viscosity between 5 and 100 poises.

To demonstrate the significance of the reaction conditions of the process of this invention, a series of reactions was conducted in accordance with the procedure of the following example.

Example 1

In a mild steel pressure vessel having a capacity of 600 ml. with a single opening to which was attached a pressure gauge and a relief valve was added a charge consisting of acetone, diphenylamine, and iodine in the proportions of the following Table I. Upon sealing the vessel at an interior temperature of 25° C., the vessel and contents were rapidly inserted in a liquid heat transfer medium of sufficient volume that the temperature of the heat transfer medium was not substantially reduced by the presence of the reaction vessel during the period of the demonstration. By observing the pressure in the reaction vessel it was determined that the contents of the reactor reached an equilibrium temperature with the bath during the period of 10 minutes. The vessel and its contents were maintained in the bath for the additional period shown. At the end of this period the reaction vessel and its contents were quenched by insertion in a bath of water at 25° C. reducing the temperature and pressure of the contents to 25° C. during a period of 5 minutes. The contents of the reactor were transferred to a distillation apparatus and the water produced and excess acetone were removed by distillation until a liquid temperature of 170° C. was achieved at atmospheric pressure. Thereupon the pressure in the system was reduced to 20 mm. of mercury and distillation continued until a liquid temperature in the distillation pot of 200° C. was obtained. During this period essentially no distillate was obtained and at the end of the heating period the temperature of the overhead vapors was beginning to rise to a temperature above about 100° C. The residue was in each case a free-flowing brown-black bright liquid having the characteristic odor of an acetone-diphenylamine condensation product. The viscosity of the product was determined in a Furol viscometer at 30° C.

The following table illustrates the viscosity of material obtained at different reaction conditions within the scope of this invention.

TABLE I

| Product: | Weight Ratio, Acetone: DPA in Reaction | Catalyst Ratio, Parts I² per 100 Parts DPA¹ | Reaction Time, hours | Reaction Temp., ° C. | Viscosity, poises |
|---|---|---|---|---|---|
| A | 0.40 | 0.4 | 6 | 315 | 5 |
| B | .52 | .4 | 5 | 320 | 20 |
| C | .55 | .4 | 6 | 315 | 23 |
| D | .52 | .4 | 6 | 325 | 36 |
| E | .52 | .4 | 3 | 335 | 13 |
| F | .69 | .4 | 6 | 315 | 19 |
| G | .69 | .4 | 3 | 325 | 5 |
| H | .69 | .4 | 5 | 325 | 51 |
| I | .69 | .4 | 8 | 325 | 77 |
| J | .69 | 1.2 | 3 | 325 | 100 |
| K | .69 | 1.2 | 1 | 315 | 41 |

¹ DPA (Diphenylamine).

It has been established that products produced under the conditions of the process of this invention have as high, and in some instances higher, stabilizer power than products produced by the processes of the prior art. To demonstrate this activity, material produced by the process of this invention was tested for the protection of styrene-butadiene rubber by an infrared procedure (High Temperature Infrared Cells for Studies of Solid High Polymer Reactions, Analytical Chemistry, vol. 33, page 456, March 1961) and compared with a similar product marketed commercially.

TABLE II

| Product | Induction period, min. | Viscosity, poises | Specific gravity, 30° C. |
|---|---|---|---|
| Commercial | 419 | 35 | 1.090 |
| Table I, F | 453 | 19 | 1.093 |

The distribution of components in the heterogeneous acetone-diphenylamine reaction product made according to the process of this invention is in most respects similar to the distribution of materials previously employed. Contrary to descriptions of earlier processes, at the temperatures employed in the present process and with the catalyst concentrations preferred, there is not substantially more of the non-volatile residue remaining after distillation of an entire sample of this material at temperatures up to 230° C. at 20 mm. It is generally recognized in this art that each of the several components in the product contribute to the stabilizing efficiency and in some undetermined manner is greater than the additive contribution of each such component individually. Heretofore, it has been assumed that employment of temperatures above about 310° C. in the condensation results in a product having a viscosity of over 100 poises at 30° C., due primarily to the presence of an unusually large amount of the non-volatile residue referred to above. It is characteristic of materials produced by the instant process employing temperatures much above those of the prior art that this distribution of volatile and non-volatile material can be controlled at will by employing the catalysts and reaction time relationship of the present invention. Thus, products having even greater stabilizing effects than this can be produced and still retain the desirable low viscosity characteristics of material presently preferred in commercial operations.

The product produced under the conditions of the process of this invention is thus in all respects similar to materials currently in commercial use and, despite the higher temperatures employed, and in addition to having the same preferred viscosity, does not have a greater proportion of high boiling non-volatile tars. A convenient method for determining the distribution of certain ingredients of acetone-diphenylamine antioxidant products is by means of gas chromatography. It has been established that such products when passed through a gas chromatograph at high temperature, approximately 60 percent of the material is accounted for and recorded on the chromatogram, the remainder comprising the non-volatile tar material. Five characteristic peaks are observed on acetone-diphenylamine reaction products obtained both by the present process and those products previously employed commercially, the first in terms of time being identifiable as unreacted diphenylamine, and subsequent peaks comprising the more or less well-defined simple condensation products of diphenylamine with varying amounts of acetone. Within the scope of the reaction conditions of this invention and by proper selection of such conditions, products throughout the range can be produced whose gas chromatograms are indistinguishable from those produced by earlier processes.

The process of this invention is directly applicable to a continuous operation. Thus a continuous reaction apparatus can be employed comprising a first tube section wherein the pre-mixed feed, as in the foregoing example, is rapidly heated to reaction temperature within a period of about 15 minutes. The pre-heated reaction mixture thereupon enters a holding zone which comprises a cylindrical pressure vessel which can be baffled internally to provide, at the flow conditions selected, a proper residence time. This hold vessel is externally heated to maintain the reaction mixture at reaction temperature. The exit from this hold vessel leads directly through an orifice sized to provide the necessary internal pressure in the reaction system at the flow rate selected, said orifice exiting into a flash vaporization chamber. This flash vaporization chamber is heated externally so as to maintain the liquid therein at a temperature of 200° C. at atmospheric pressure. The unreacted acetone and water produced are removed from this chamber as vapor and are condensed for rectification and recycle. The hot liquid collecting in the flash vaporization chamber is withdrawn continuously and fed to a reboiler where sufficient heat is supplied to maintain the temperature of the liquid at 200° C. while removing residual volatile material by subjecting said reboiler zone to a vacuum in the range of 20 mm. of mercury. The product continuously removed from the reboiler is the desired acetone-diphenylamine reaction product suitable for use as an antioxidant.

Having described the process of this invention by the above illustrative examples, it is not intended that the invention be limited except as described in the appended claims.

I claim:
1. A catalytic process for the manufacture of acetone-diphenylamine reaction product comprising reacting between about 0.4 and 0.7 part of acetone per part of diphenylamine in the presence of a catalyst selected from the group consisting of iodine and ferrous iodide for a period not in excess of 8 hours at a temperature between about 315° C. and 350° C., wherein the amount of catalyst employed is between the limits of 0.3 part and 1.5 parts per 100 parts of diphenylamine, to provide a product which, upon removal of excess acetone and the water produced in the reaction, has a viscosity not in excess of 100 poises at 30° C.

2. The process of claim 1 wherein the catalyst is between about 0.4 and 1.2 parts per 100 parts of diphenylamine.

3. A continuous reaction, within the limitations of claim 1, for the manufacture of an acetone-diphenylamine condensation product wherein a solution of diphenylamine in acetone containing a reaction catalyst is passed through a heating zone wherein said solution is heated to a temperature of between about 315° C. and 350° C. within a period of time of about 15 minutes, and thereupon is introduced into a holding zone wherein heat is supplied to maintain said solution at reaction temperature for a period not in excess of eight hours, whereafter said solution is introduced to a vaporization chamber wherein the unreacted acetone and water produced are removed by distillation until the product has a temperature of substantially 200° C. at atmospheric pressure.

References Cited

UNITED STATES PATENTS

| 2,562,802 | 7/1951 | Mankowich et al. | 260—576 |
| 2,562,803 | 7/1951 | Mankowich | 260—576 |

CHARLES B. PARKER, *Primary Examiner.*

ROBERT V. HINES, *Assistant Examiner.*

U.S. Cl. X.R.

260—566, 809; 252—401